United States Patent [19]

Aoki et al.

[11] 4,202,365
[45] May 13, 1980

[54] FIRE TESTED BUTTERFLY VALVE

[75] Inventors: Tadashi Aoki, Ohmiya, Japan; Jerry D. MacAfee, Northborough; James F. Donnelly, Leicester, both of Mass.

[73] Assignee: Jamesbury Corporation, Worcester, Mass.

[21] Appl. No.: 866,814

[22] Filed: Jan. 4, 1978

[51] Int. Cl.² .................................. F16K 5/06
[52] U.S. Cl. ..................... 137/72; 251/173; 251/306
[58] Field of Search ................. 137/72–77; 251/173, 174, 306, 307

[56] References Cited

U.S. PATENT DOCUMENTS

| | | | |
|---|---|---|---|
| 3,346,234 | 10/1967 | Allen | 251/174 |
| 3,480,253 | 11/1969 | Priese et al. | 251/174 |
| 3,608,861 | 9/1971 | Helman et al. | 251/306 X |
| 4,105,040 | 8/1978 | Chester | 251/174 X |

FOREIGN PATENT DOCUMENTS 45-32861 10/1970 Japan .......................... 251/306

Primary Examiner—Irwin C. Cohen
Assistant Examiner—Richard Gerard
Attorney, Agent, or Firm—Oblon, Fisher, Spivak, McClelland & Maier

[57] ABSTRACT

Disclosed is a fire-tested butterfly valve having an annular resilient seat member and an annular, flexible metal seat member, both held in place in a valve housing by being clamped between cooperating surfaces of the valve housing and a valve seat retaining ring insert. In a first embodiment, a fusible washer with a lower destruction temperature than that of the annular resilient seat is positioned between the resilient seat and the metal seat. In a second embodiment, an integrally formed protrusion on the annular resilient seat contacts the metal seat. In both embodiments, the metal seat is held out of contact with the butterfly disc until exposure to a fire melts the fusible washer or the seat protrusion, at which time the metal seat comes into contact with the disc to establish a secondary, metal-to-metal, fire resistant seal.

5 Claims, 3 Drawing Figures

U.S. Patent
May 13, 1980
4,202,365
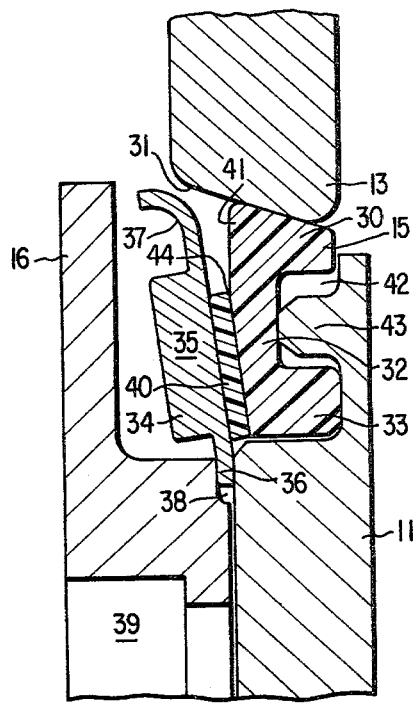
FIG.2
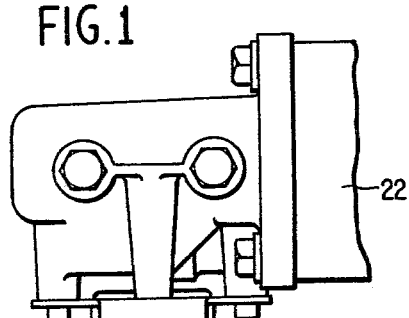
FIG.1
FIG.3

FIRE TESTED BUTTERFLY VALVE

CROSS-REFERENCE TO RELATED APPLICATIONS

This application is related to the commonly assigned patent application Ser. No. 866,870 entitled "Fire-Safe Butterfly Valve" by Tadashi Aoki, filed Jan. 4, 1978.

BACKGROUND OF THE INVENTION

This invention relates to rotary fluid control valves of the butterfly valve type. These valves have a circular fluid flow channel therethrough and a circular disc mounted for rotation between an open position, in which the disc lies substantially parallel to the axis of the fluid flow channel through the valve, and a closed position in which the disc lies perpendicular to this axis. Conventionally, the disc edge contacts a relatively soft or resilient annular seat circumscribing the fluid flow channel when the valve is in the closed position, and the sealing contact between these members will shut off fluid flow through the channel.

Valves of the type just described have not commonly been used in certain applications requiring fire-tested valves. Briefly stated, fire-tested valves are valves that must function as conventional valves in general service, but which must be able to survive exposure to a fire occurring in their environment. Many older, conventional valve types such as gate valves, globe valves and plug valves are metal-to-metal seated, and thus are assumed to be fire resistant. Soft-seated valves, on the other hand, must be certified fire-tested because of several industrial fires several decades ago which were eventually attributed to leakage from rubber or soft-seated valves during a "small" fire, which thus spread out of control when fed by that leakage. Thus, as is apparent, fire-tested valves are often used in flammable fluid service. One of the basic requirements for a fire-tested valve is that there be no loss of performance attributable to the safety feature. Since normally a fire does not occur during the life of the valve, it is expected to function just as a conventional valve would, with equivalent pressure and temperature ratings and cycle life. But, it is also expected to seal within standardized limits after a fire. Several examples of industry standards for fire testing are: American Petroleum Institute (Division of Refining) Standard 607 for Fire Test for Soft Seated Ball Valves; American Petroleum Institute (Division of Production) Standard for Fire Test for API SPEC 6A and 6D Valves; and Oil Companies Materials Association Specification No. FSV. 1, Fire Safe Test for Soft Seat Ball Valves. As is apparent from the titles of those specifications, the most common fire-tested soft seated valves are the ball valve type.

A further desirable feature in butterfly valves is the ability to shut off liquid flow coming from either side of the disc. Many existing butterfly valves are unidirectional, i.e., only one side of the valve may face the upstream side of the flow line if sealing efficiency is to be maintained. It is, of course, desirable for the valve to be capable of shutting off and controlling fluid flow regardless of the direction from which the fluid pressure is applied to the valve.

Still a further desirable feature in butterfly valves is the ability to enhance the sealing effectivenss of the valve by means of the pressure against the seat by the fluid being controlled. Many existing butterfly valves have seat configurations that cannot take advantage of the forces generated by the line pressure when the valve is closed.

It is an object of the present invention to provide a butterfly valve suitable for service with flammable liquids that may be certified as a fire-tested valve, yet provide a simple structure with improved sealing characteristics.

It is another object of the present invention to provide a butterfly valve with the aforementioned fire-tested feature and also to be capable of shutting off and controlling fluid flow regardless of the direction from which fluid pressure is applied to the valve.

It is a further object of the present invention to provide a butterfly valve with a fire-tested feature, an ability to control fluid flow regardless of its direction, and also to enhance the sealing effectivenss of the valve by means of the line pressure, at least as it bears against the resilient seat.

Other objects will become apparent from a consideration of this disclosure.

SUMMARY OF THE INVENTION

The butterfly valve of this invention is of a type wherein the butterfly disc element is mounted on a shaft for rotation about an axis perpendicular to the axis of the fluid flow channel. The butterfly disc has a flange extending from one planar surface thereof, and the shaft passes through and is attached to this shaft so that the disc edge will form an unbroken sealing surface circumscribing the entire circumference of the disc.

The annular resilient seat member circumscribes the fluid flow channel and is located so that it will cooperate with the disc sealing surface when the valve disc is closed. An interference fit exists between the resilient seat and the disc edge to improve the sealing effectiveness therebetween.

An annular, flexible metal seat member also circumscribes the fluid flow channel and is adjacent the resilient seat. Interposed between the metal seat and the resilient seat is either an annular fusible washer, in a first embodiment, or a protrusion integrally formed on the resilient seat member, in a second embodiment. The metal seat is constructed in a flat form, but during assembly of the valve, the metal seat is forced into a conical or Belleville-like shape so that it is biased toward the resilient seat although the washer or protrusion prevents the metal seat from normally coming into contact with the disc.

Both the resilient seat member and the metal seat member are clamped in a groove formed by cooperating surfaces in the valve housing and a ringlike valve insert member. The insert is bolted to the housing by a plurality of bolts spaced about its extent.

If the valve of the first embodiment should be exposed to fire, the fusible washer melts and is destroyed, and the inherent flexing or biasing action of the metal seat causes it to displace toward the resilient seat. Continued exposure to heat will destroy the resilient seat but the metal seat comes into contact with the sealing edge of the butterfly disc and establishes a secondary, metal-to-metal, fire resistant seat.

The integral protrusion on the resilient seat of the valve of the second embodiment serves essentially the same function as the just discussed fusible washer. When the valve is exposed to fire, the resilient seat begins to melt and deforms. The protrusion also melts and deforms, thereby allowing the metal seat to flex and come into contact with the sealing edge of the disc to establish a secondary, metal-to-metal, fire resistant seat.

As a further feature of the valve of the present invention, the resilient seat is constructed consistent with the teachings of commonly assigned U.S. Pat. No. 3,608,861 so that line pressure from either direction enhances the sealing effectivenss between the disc and the seat.

Further features of the invention will be apparent from a consideration of the detailed description of a preferred embodiment of the butterfly valve and a consideration of the accompanying drawings.

BRIEF DESCRIPTION OF THE DRAWINGS

FIG. 1 is an elevation view, partially in cross-section, of a butterfly valve of the type disclosed as this invention;

FIG. 2 is a cross-sectional view of the zone of cooperation between the annular resilient seat, the metal seat, and the sealing surface of the disc of a first embodiment of the valve of the instant invention.

FIG. 3 is a cross-sectional view of the zone of cooperation between the annular resilient seat, the metal seat, and the sealing surface of the disc of a second embodiment of the valve of the instant invention.

DESCRIPTION OF A PREFERRED EMBODIMENT

Depicted in FIG. 1 is a valve 10 having a housing 11 defining flow channel 12 of circular cross-section therethrough, butterfly disc 13 mounted for rotation with shaft 14, annular resilient seat 15 and seat retainer ring 16.

The fluid flow channel 12 has an imaginary flow axis indicated at 13a. Shaft 14 is essentially perpendicular to flow axis 13a. The shaft is mounted for rotation in valve housing 11 with the aid of lower bearing means 17 and upper bearing means 18. Lower shaft plug means 19, not described in detail, is inserted in the bottom of the shaft bore to prevent the escape of internal fluid pressure.

Shaft seal 21 prevents the escape of internal fluid pressure at the top of valve 10. Actuator 22, not shown in detail, is employed to rotate the valve between open and closed position.

FIG. 2 shows, in enlargement, the zone or cooperation between resilient seat 15 and disc 13 in a first embodiment of the invention.

Seat 15 has an inclined lip portion 30 configured to sealingly cooperate with disc sealing surface 31. The dimensions of seat 15 are such that an interference fit exists between seat and disc to enhance sealing effectiveness. Annular seat 15 further includes a narrowed linking portion 32 that connects lip portion 30 with heel portion 33.

Annular metal seat 34 is formed in a flat configuration and includes a generally thickened central portion 35, an outer portion or support tang 36, and an inner, curved seat portion 37. Groove 38 is formed by facing surfaces of valve housing 11 and insert 16, and annular metal seat 34 is fixed in the housing by trapping outer support tang 36 in groove 38. Insert 16 is attached to valve housing 11 by a plurality of bolts passing through corresponding bolt holes 39 formed in insert 16.

Fusible washer 40 is interposed between thickened central portion 35 of metal seat 34 and surface 41 of resilient seat 15. Metal seat 34 is formed flat so that outer support tang 36 is a planar extension of thickened central portion 35. Upon assembly, tang 36 is trapped in groove 38, but because of the presence of fusible washer 40, metal seat 34 is formed into a Belleville shape. Seating portion 37 of metal seat 34 is thus normally held out of contact from disc sealing surface 31, yet the spring force of the metal seat exerts enough force through washer 40 to clamp that portion of surface 41 that is contacted by the washer. Thus resilient seat 15 is held in place in the valve by being clamped between fusible washer 40 and the valve housing 11.

A fulcrum 43, formed as an integral part of valve housing 11, projects into resilient seat groove 42. The radially inner most edge 44 of fusible washer 40 acts as a second fulcrum on the other side of seat 15. The radial spacing of valve housing fulcrum 43 and washer fulcrum 44 are controlled in the manner disclosed in commonly assigned U.S. Pat. No. 3,608,861 to ensure that the line pressure may be employed to enhance the disc and seat sealing effectiveness regardless of the direction from which pressure is applied. Briefly described, when the valve is closed and when pressure is from the left side of FIG. 2, the disc is designed to displace a given amount to the right. Lip 30 of seat 15 will tend to displace a greater amount to the right since it is relatively free to flex about fulcrum 43. The pressure in the line thus enhances the already existing interference fit between the disc and seat. When pressure is applied from the right side of FIG. 2, the displacement of disc 13, although to the left, is essentially of the same magnitude as the disc displacement was to the right, but lip 30 of seat 15 tends to displace less than the displacement of the disc. This is due to the radial placement of fulcrum 44 which is radially inward of fulcrum 43. Fulcrum 44 restrains a greater portion of linking portion 32 of seat 15 than does fulcrum 43, with an attendant greater resistance to flexure. Once again, the pressure in the line enhances the already existing interference fit between the disc and seat.

Fusible washer 40 should be made of a material having a lower destruction temperature than the resilient seat 15 so that exposure of the valve to fire will allow the washer to destruct before the resilient seat. When the washer is destroyed the metal seat 34 is flexed or biased, by virtue of its Belleville shape, toward the disc so that seating portion 37 comes into contact with disc sealing surface 31, thereby establishing a secondary, metal-to-metal, fire resistant seal.

In a second embodiment of the invention, illustrated in FIG. 3, an integral protrusion 45 is formed on the linking portion 32 of resilient seat 15. This protrusion replaces fusible washer 40 and, in normal operation, holds metal seat 34 out of contact with disc sealing surface 31. When this valve is exposed to fire, the resilient seat and its integral projection begin to melt and deform. As this deformation occurs, the metal seat 34 flexes into contact with the disc and establishes a secondary, metal-to-metal, fire resistant seal.

Examples of materials for the various components of this valve may be stainless steel, monel, or like metal for annular metal seat 34, polytetrafluoroethylene for resilient seat 15, and nylon, polyethylene, polyvinylidene fluoride, chlorotrifluroethylene, or fluorinated ethylenepropylene-polymer for fusible washer 40, depending on temperature and corrosive requirements of the application.

Obviously, many modifications and variations of the present invention are possible in light of the above teachings. It is therefore to be understood that within the scope of the appended claims, the invention may be practiced otherwise than as specifically described herein.

What is claimed as new and desired to be secured by U.S. Letters Patent is:

1. A butterfly valve comprising:
   a housing defining a fluid flow channel;
   a shaft;
   a butterfly valve disc mounted on said shaft for rotation within said channel to control fluid flow therethrough;
   an annular resilient seat member circumscribing said channel to sealingly cooperate with the edge of said disc when said disc is perpendicular to said channel;
   an annular, flexible metal seat member adjacent said resilient seat member;
   means positioned between said resilient seat and said metal seat resisting biasing of said metal seat into contact with said disc and to hold said metal seat in a flexed position normally out of contact with said edge of said disc but which will melt upon exposure to fire thereby permitting said metal seat to flex and contact said disc edge and establish a secondary, metal-to-metal, fire resistant seal; and
   an insert ring wherein said housing and said insert ring form a groove positioned along an outer portion of said metal seat, within which said outer portion of said metal seat is fixed.

2. The butterfly valve of claim 1 wherein said means positioned between said resilient seat and said metal seat comprises an integral protrusion formed on the side of said resilient seat facing said metal seat of a size sufficient normally to hold said metal seat out of contact with said edge of said disc.

3. A butterfly valve as set forth in claim 1, said metal seat member further comprising an outer support tang formed on said metal seat and trapped in said groove.

4. A butterfly valve as set forth in claim 3, said metal seat member further comprising an inner curved seat portion for contacting said edge of said disc.

5. A butterfly valve as set forth in claim 1, said metal seat member further comprising an inner curved seat portion for contacting said edge of said disc.

* * * * *